(12) United States Patent
Chu et al.

(10) Patent No.: US 7,486,432 B2
(45) Date of Patent: Feb. 3, 2009

(54) METHOD FOR PREPARING A PERIODICALLY POLED STRUCTURE

(75) Inventors: Hong Yu Chu, Hsinchu (TW); Joseph Lung Chang Ho, Hsinchu (TW); Tze Chia Lin, Hsinchu (TW); Ming Hsien Chou, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 211 days.

(21) Appl. No.: 11/683,904

(22) Filed: Mar. 8, 2007

(65) Prior Publication Data
US 2008/0218846 A1    Sep. 11, 2008

(51) Int. Cl.
*G02F 1/00* (2006.01)
*G02F 1/03* (2006.01)
*G02F 1/35* (2006.01)

(52) U.S. Cl. ............... 359/321; 359/326; 359/328; 359/332; 359/245; 385/122; 257/295; 361/225; 372/22; 216/24

(58) Field of Classification Search ............... 359/245, 359/321, 326–332, 556; 385/14, 122, 129, 385/142; 257/295; 361/157.15, 164; 216/24; 117/1–3, 13, 19, 20, 108, 200; 372/6, 22, 372/23, 25, 71; 427/526, 527, 529; 365/145
See application file for complete search history.

(56) References Cited

U.S. PATENT DOCUMENTS

| | | | | |
|---|---|---|---|---|
| 5,121,250 A * | 6/1992 | Shinozaki et al. | ............ | 359/328 |
| 5,185,752 A * | 2/1993 | Welch et al. | ................... | 372/22 |
| 5,193,023 A * | 3/1993 | Yamada et al. | ............... | 359/245 |
| 5,382,334 A * | 1/1995 | Miyaguchi et al. | .......... | 361/225 |
| 5,506,722 A * | 4/1996 | Mizuuchi et al. | ............ | 359/332 |
| 5,521,750 A * | 5/1996 | Onoe et al. | .................. | 359/332 |
| 5,734,772 A * | 3/1998 | Gopalan et al. | ............. | 385/122 |
| 5,748,361 A * | 5/1998 | Gupta et al. | ................. | 359/332 |
| 5,875,053 A * | 2/1999 | Webjorn et al. | ............. | 359/326 |
| 6,002,515 A | 12/1999 | Mizuuchi et al. | | |
| 6,211,999 B1 * | 4/2001 | Gopalan et al. | ............. | 359/326 |
| 6,542,285 B1 * | 4/2003 | Batchko et al. | ............. | 359/326 |
| 6,555,293 B1 * | 4/2003 | Fejer et al. | ................... | 430/311 |
| 6,602,558 B1 * | 8/2003 | Komeda et al. | ............. | 427/526 |
| 6,624,923 B2 * | 9/2003 | Furukawa et al. | ........... | 359/326 |
| 6,677,629 B1 * | 1/2004 | Fischer et al. | ............... | 257/295 |
| 6,731,422 B2 * | 5/2004 | Yamaguchi et al. | ......... | 359/332 |
| 6,747,787 B2 * | 6/2004 | Furukawa et al. | ........... | 359/326 |
| 7,170,671 B2 * | 1/2007 | Wu et al. | ..................... | 359/332 |
| 7,304,880 B2 * | 12/2007 | Mizuuchi et al. | ............ | 365/145 |

* cited by examiner

*Primary Examiner*—Loha Ben
(74) *Attorney, Agent, or Firm*—WPAT, Inc; Anthony King

(57) ABSTRACT

A method for preparing a periodically poled structure according to this aspect of the present invention comprises the steps of providing a ferroelectric substrate and performing a poling process by applying a poling current to at least one portion of the ferroelectric substrate according to a current waveform. The current waveform include a major phase and a tailed phase accompanying the major phase; the major phase has at least one peak current (Ip) and terminates when the current drops substantially equal to Ip/e, and the charge delivered to the portion of the ferroelectric substrate during the major phase is larger than that delivered during the tailed phase. The nucleation phase is configured to generate nucleation sites in the portion of the ferroelectric substrate and the spreading phase is configured to increase the size of the nucleation sites.

37 Claims, 9 Drawing Sheets

METHOD FOR PREPARING A PERIODICALLY POLED STRUCTURE

BACKGROUND OF THE INVENTION (A) Field of the Invention

The present invention relates to a method for preparing a periodically poled structure, and more particularly, to a method for preparing a periodically poled structure by controlling the charge into a ferroelectric single crystal.

(B) Description of the Related Art

The periodically poled structure having poled domains in a ferroelectric single crystal such as lithium niobate ($LiNbO_3$), lithium tantalite ($LiTaO_3$) and potassium titanyl phosphate ($KTiOPO_4$) may be widely used in the optical fields such as optical storage and optical measurement. There are several methods for preparing the periodically poled structure such as the proton-exchanging method, the electron beam-scanning method, the electric voltage applying method, etc.

U.S. Pat. No. 6,002,515 discloses a method for manufacturing a polarization inversion part on a ferroelectric crystal substrate. The polarization inversion part is prepared by steps of applying a voltage in the polarization direction of the ferroelectric crystal substrate to form a polarization inversion part, conducting a heat treatment for reducing an internal electric field generated in the substrate by the applied voltage, and then reinverting polarization in a part of the polarization inversion part by applying a reverse direction voltage against the voltage that was previously applied. In other words, the method for preparing a polarization inversion part disclosed in U.S. Pat. No. 6,002,515 requires performing the application of electric voltage twice.

SUMMARY OF THE INVENTION

One aspect of the present invention provides a method for preparing a periodically poled structure by controlling the charge into a ferroelectric single crystal.

A method for preparing a periodically poled structure according to this aspect of the present invention comprises the steps of providing a ferroelectric substrate and performing a poling process by applying a poling current to at least one portion of the ferroelectric substrate according to a current waveform. The current waveform includes a major phase and a tailed phase accompanying the major phase, and the major phase has at least one peak current (Ip) and terminates when the current drops substantially to Ip/e. The charge delivered to the portion of the ferroelectric substrate during the major phase is larger than that delivered during the tailed phase.

Another aspect of the present invention provides a method for preparing a periodically poled structure comprising the steps of providing a ferroelectric substrate and performing a poling process by applying a poling electric field to at least one portion of the ferroelectric substrate according to an electric field waveform including a nucleation phase and a spreading phase accompanying the nucleation phase, wherein the nucleation phase is configured to generate nucleation sites in the portion of the ferroelectric substrate and the spreading phase is configured to increase the size of the nucleation sites.

A further aspect of the present invention provides a method for preparing a periodically poled structure comprising the steps of providing a ferroelectric substrate, performing a pre-poling process by applying a reiterating electric field to at least one portion of the ferroelectric substrate according to a reiterating waveform to let the portion reiterate domain inversions, and performing a poling process by applying a poling electric field to the portion of the ferroelectric substrate according to an electric field waveform including a nucleation phase and a spreading phase accompanying the nucleation phase. In the latter process the nucleation phase is configured to generate nucleation sites in the portion of the ferroelectric substrate and the spreading phase is configured to increase the size of the nucleation sites.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

FIG. 1 to FIG. 7 illustrate a method for preparing a periodically poled structure 10 according to one embodiment of the present invention. First, a ferroelectric substrate 12 consisting of a plurality of first domains 16 and second domains 18 positioned between the first domains 16 is provided. The ferroelectric substrate has an upper surface 12A and a bottom surface 12B, and a plurality of upper electrodes 14A are formed on the upper surface 12A and a plurality of bottom electrodes 14B are formed on the bottom surface 12B. The original polarization direction of the ferroelectric substrate 12 is from −Z to +Z, as shown by the arrows in FIG. 1.

Figure 1:
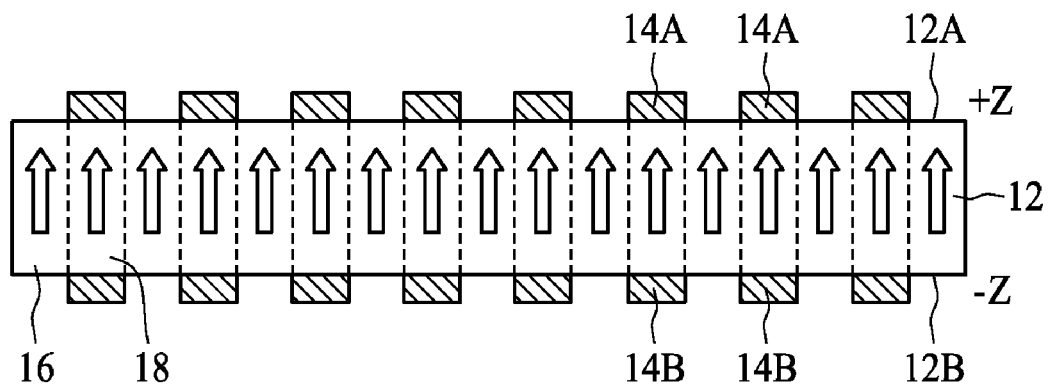
FIG. 1 to FIG. 7 illustrate a method for preparing a periodically poled structure 10 according to one embodiment of the present invention.
Figure 2:
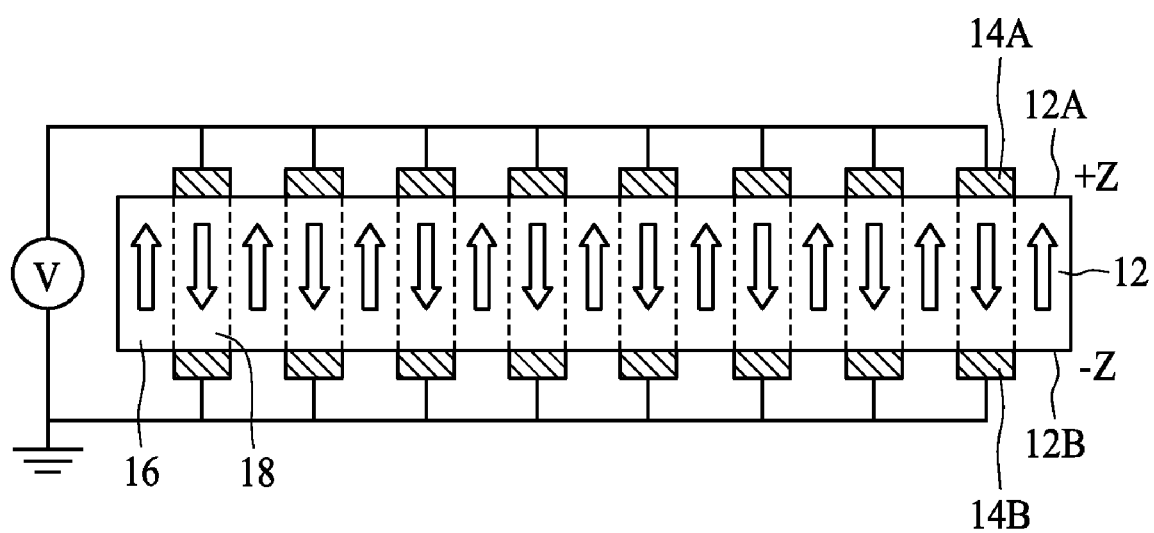
Figure 3:
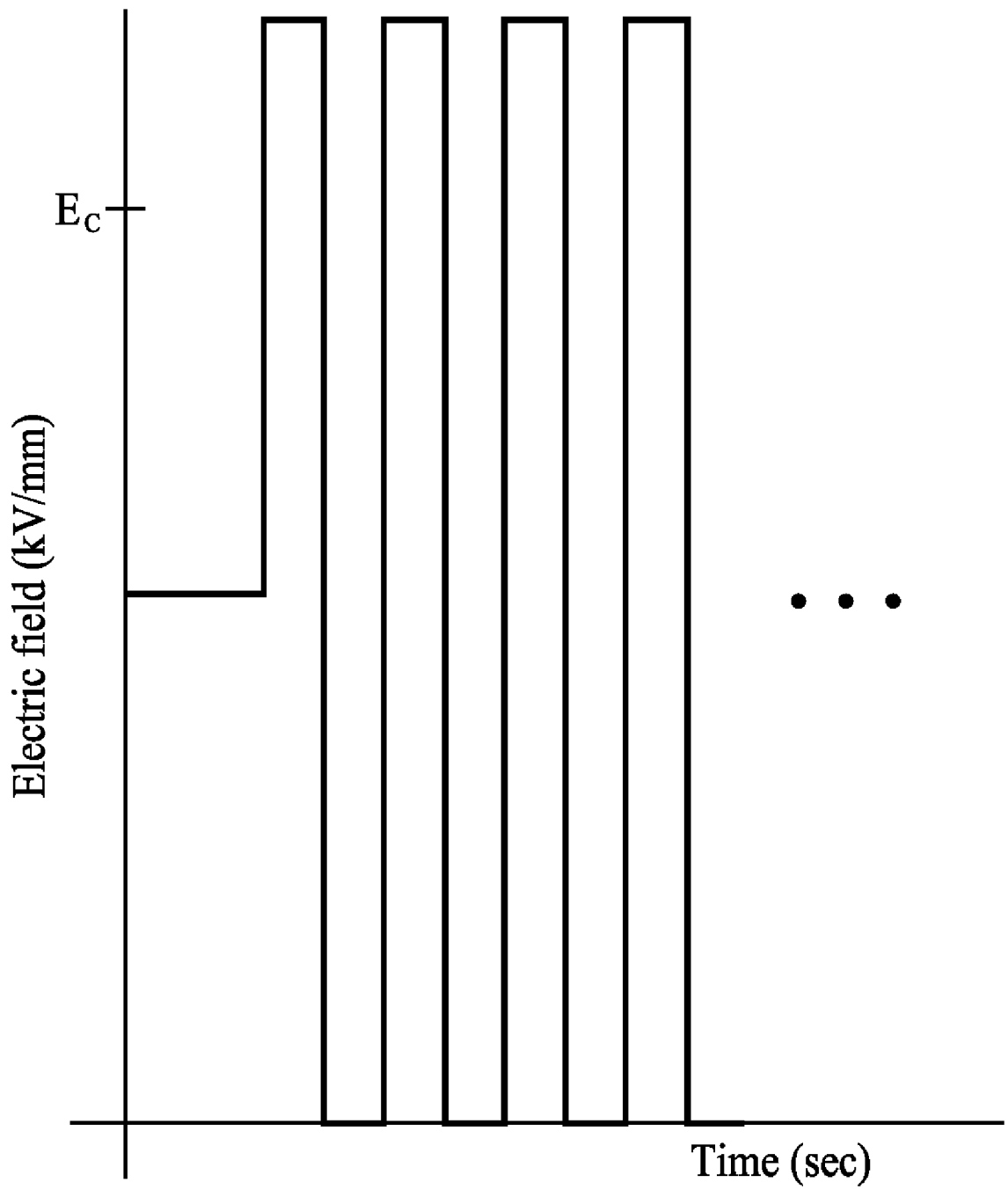
Figure 4:
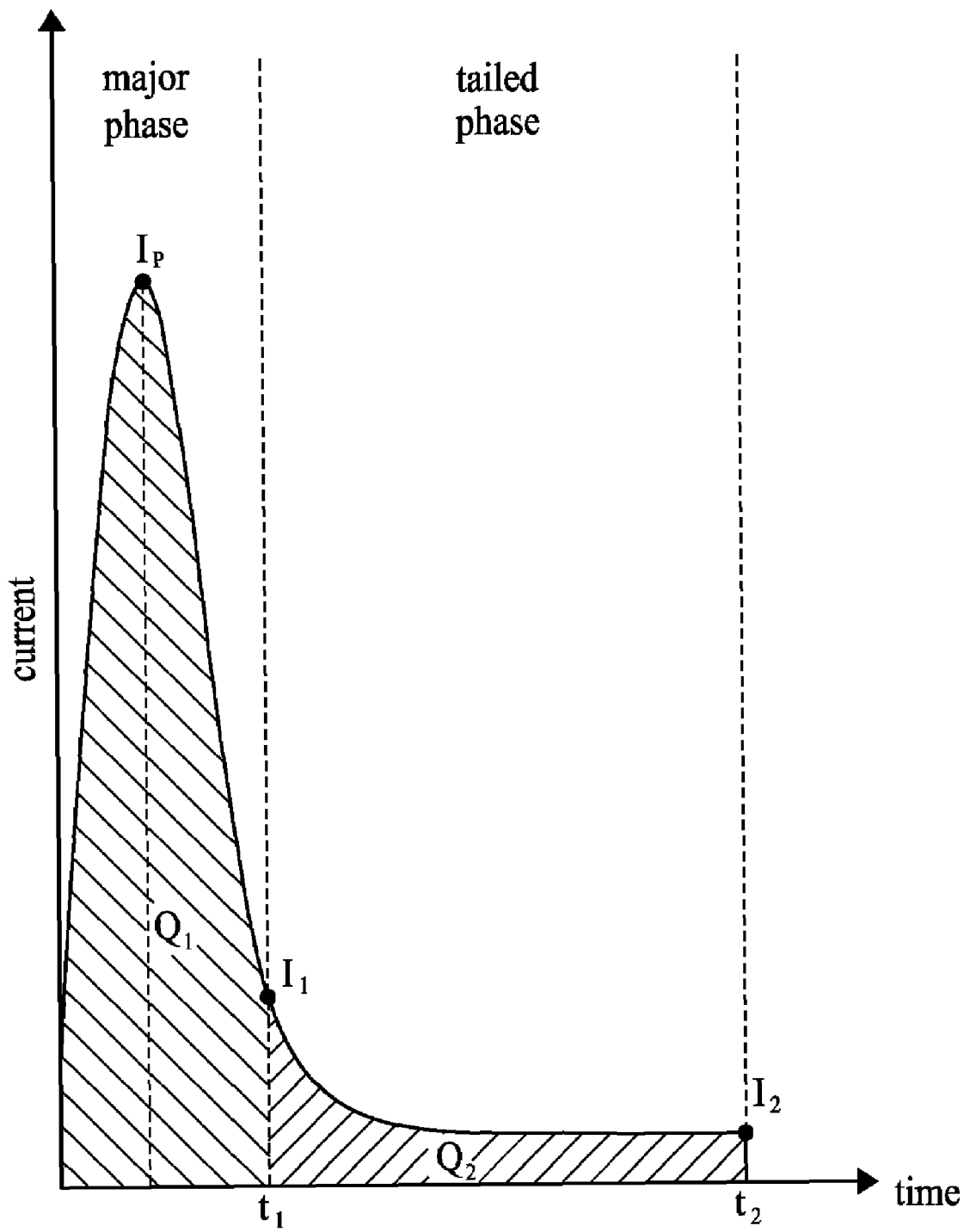

Referring to FIG. 2, a pre-poling process is performed by applying a reiterating voltage difference (V) between the upper electrodes 14A and the bottom electrodes 14B. The ferroelectric substrate 12 is prepared by epitaxy process and may include some crystal defects therein, which inhibit the quality of a formal poling process. The iterating voltage difference (V) applied in the pre-poling process generates reiterating electric field according to a reiterating waveform to let the second domains 18 of the ferroelectric substrate 12 reiterate domain inversions, which can reduce the inhibition effect of the crystal defects. The reiterating waveform may include a plurality of waves such as square waves, as shown in FIG. 3. The amplitude (the reiterating electric field) of the square waves is larger than the coercive field (Ec) of the ferroelectric substrate 12, for example, between 18 and 21 kV/mm.

Referring to FIG. 3, a poling process is performed by applying a poling current to the second domains 18 of the ferroelectric substrate 12 according to a current waveform. The current waveform includes a major phase and a tailed phase accompanying the major phase, wherein the major phase has at least one peak current (Ip) and terminates when the current drops substantially to Ip/e, i.e., $I_1 = Ip/e$. The charge delivered to the second domains 18 of the ferroelectric substrate 12 during the major phase is preferably larger than that delivered during the tailed phase, i.e., Q1 is larger than Q2. For example, the ratio of the charge delivered to the second domains 18 of the ferroelectric substrate 12 during the major phase to the charge delivered during the tailed phase is between 1:1 and 1:9. The duration ($t_1$) of the major phase to the duration ($t_2-t_1$) of the tailed phase is preferably between 1:1 and 1:5. The tailed phase terminates at a tail current ($I_2$), and the peak current (Ip) to the tail current ($I_2$) is preferably larger than 5.

Figure 5:
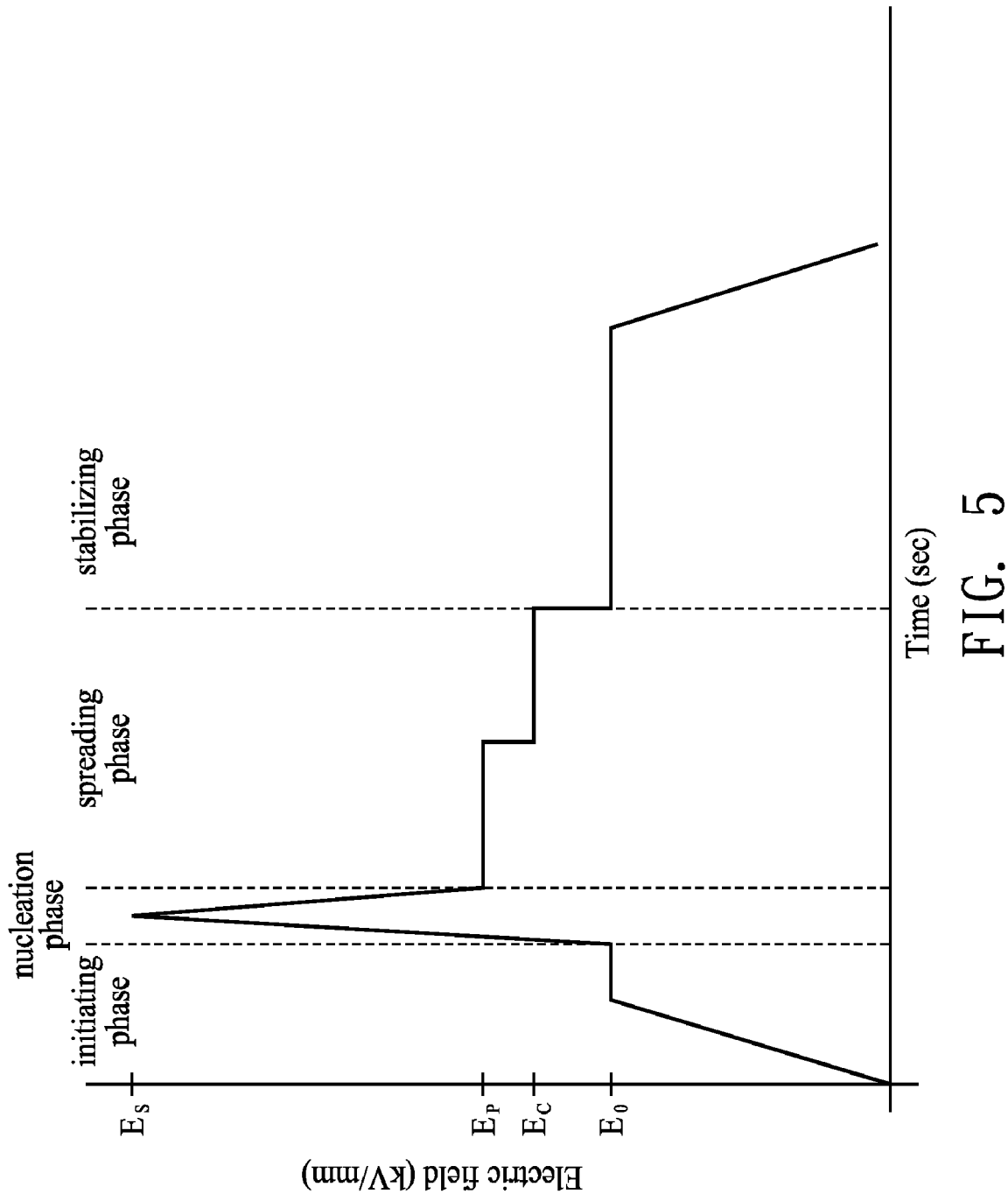
Figure 6:
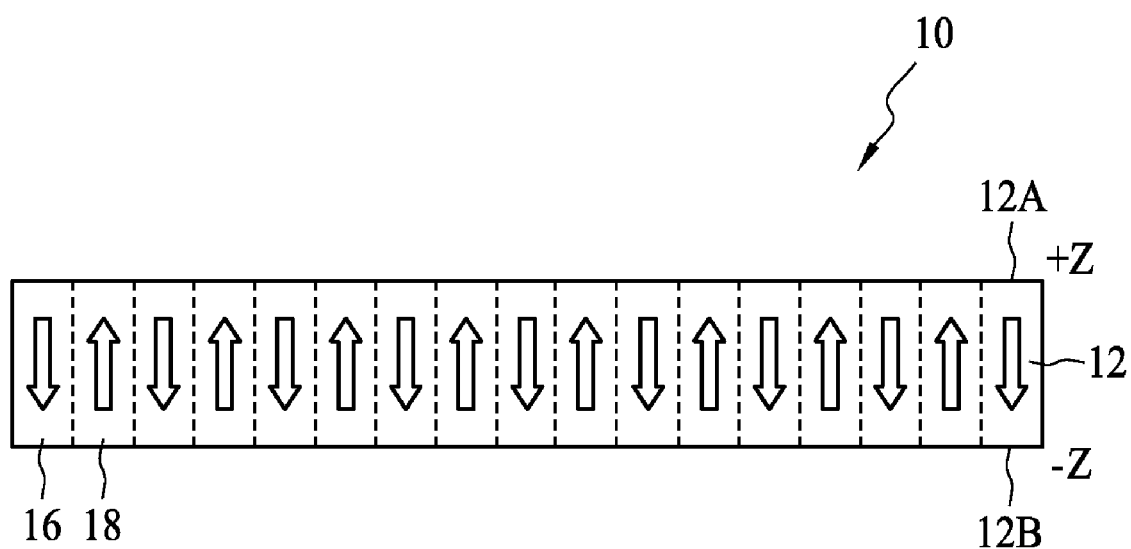

Referring to FIG. 5, the current waveform can be implemented by applying a poling electric field to the second domains 18 of the ferroelectric substrate 12 according to an electric field waveform including an initiating phase, a nucleation phase, a spreading phase and a stabilizing phase. The nucleation phase is configured to generate nucleation sites in the second domains 18 of the ferroelectric substrate 12 and the spreading phase is configured to increase the size of the nucleation sites in the second domains 18. The nucleation phase includes at least one spike-shaped nucleation wave. The spike-shaped nucleation wave has a spike field ($E_{S1}$) configured to generate nucleation sites in the second domains 18 of the ferroelectric substrate 12. The nucleation phase terminates as the electric field decreases from the spike field ($E_{S1}$) to a poling field ($E_{P1}$) to initiate the spreading phase configured to drive the nucleation sites to spread. The electric field of the spreading phase decreases from the poling field ($E_{P1}$) to a stabilizing field ($E_0$) in a stepped manner. The electric field of the stabilizing phase is maintained at the stabilizing field ($E_0$) for predetermined duration and decreases to zero to complete the periodically poled structure 10 with the polarization direction of the second domains 18 being reversed, as shown in FIG. 6.

Figure 7:
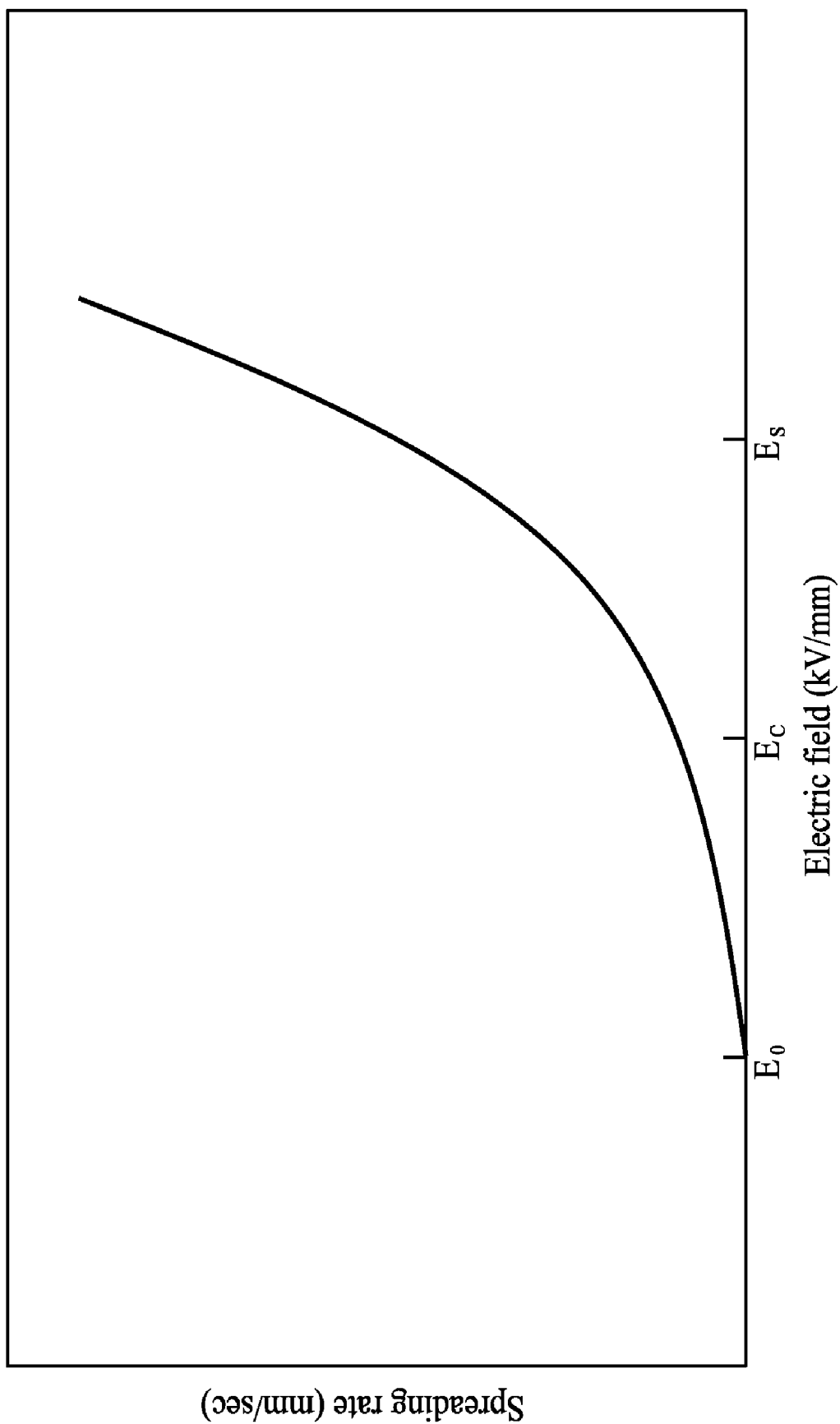

For example, the coercive field ($E_C$) of MgO doped congruent lithium niobate (MgOCLN) crystal is about 1.7 kV/mm at 150° C., the spike field ($E_{S1}$) is preferably larger than the coercive field ($E_C$), for example, between 18 and 21 kV/mm, and the duration of the spike-shaped nucleation wave is preferably between 50 and 200 microseconds. Since there are different sizes of nucleation sites (grains) in the second domains 18 during the spreading phase, the larger grains will experience a smaller electric field and the smaller grain will experience a stronger electric field under the same external voltage difference, and the spreading rate of the grain is proportional to the applied electric field, as shown in FIG. 7.

The decrease of the applied electric field in the spreading phase in the stepped manner (or in the ramp-shaped manner) contributes to adjust the spreading rate of the grains with different sizes to get a better uniformity. Preferably, the initiating phase is performed by applying an initiating field ($E_0$) to the second domains 18 before the nucleating phase, and the stabilizing phase is performed subsequent to the spreading phase by applying a stabilizing field the same as the initiating field ($E_0$) to the second domains 18. In particular, both the spike field ($E_{S1}$) and poling field ($E_{P1}$) are preferably larger than the coercive field ($E_C$) of the ferroelectric substrate 12, and the initiating field ($E_0$) and the stabilizing field ($E_0$) is preferably smaller than the coercive field ($E_C$).

Figure 8:
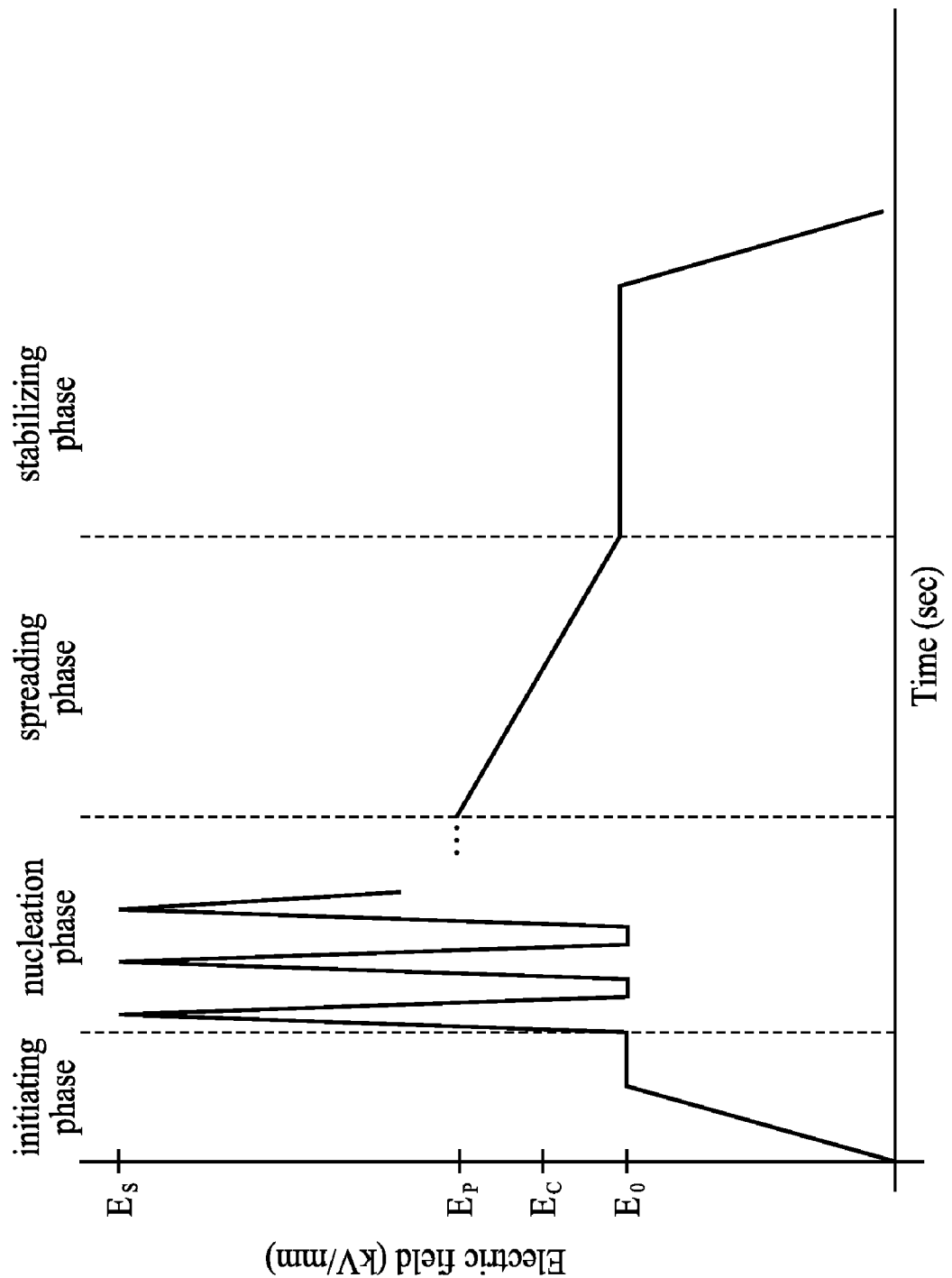
FIG. 8 illustrates another electric field waveform according to another embodiment of the present invention.

FIG. 8 illustrates another electric field waveform according to another embodiment of the present invention. Compared to the electric field waveform having one spike-shaped nucleation wave as shown in FIG. 5, the electric field waveform shown in FIG. 8 has a plurality of spike-shaped nucleation waves. The single spike-shaped electric field can be replaced by multiple spike-shaped electric fields to increase the uniformity of the nucleation site distribution. In addition, the electric field in the spreading phase decreases in a stepped manner as shown in FIG. 5, while the electric field in the spreading phase decreases in a ramp-shaped manner, as shown in FIG. 8.

Figure 9:
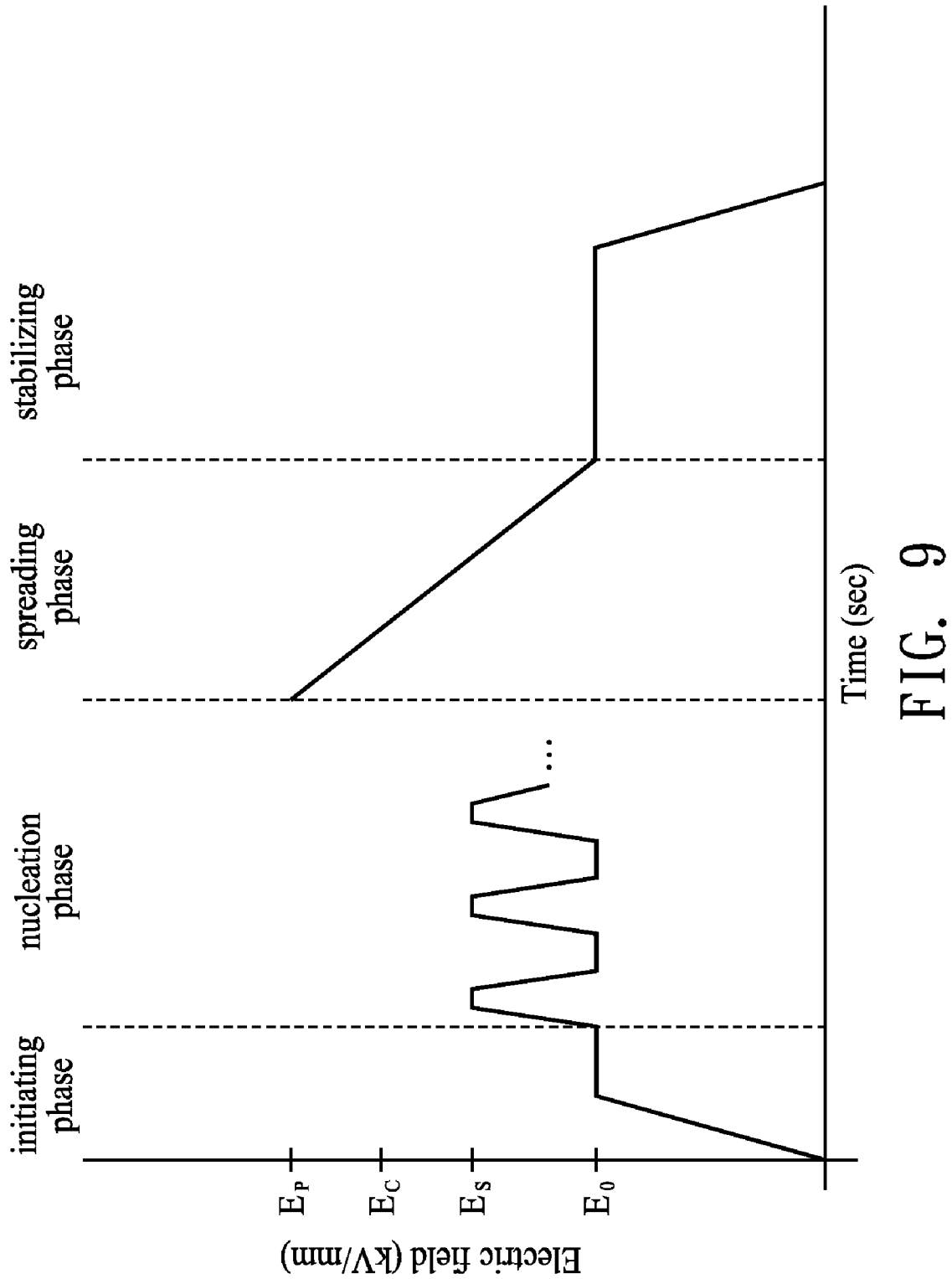
FIGS. 9 and 10 illustrate another electric field waveform according to another embodiment of the present invention.
Figure 10:
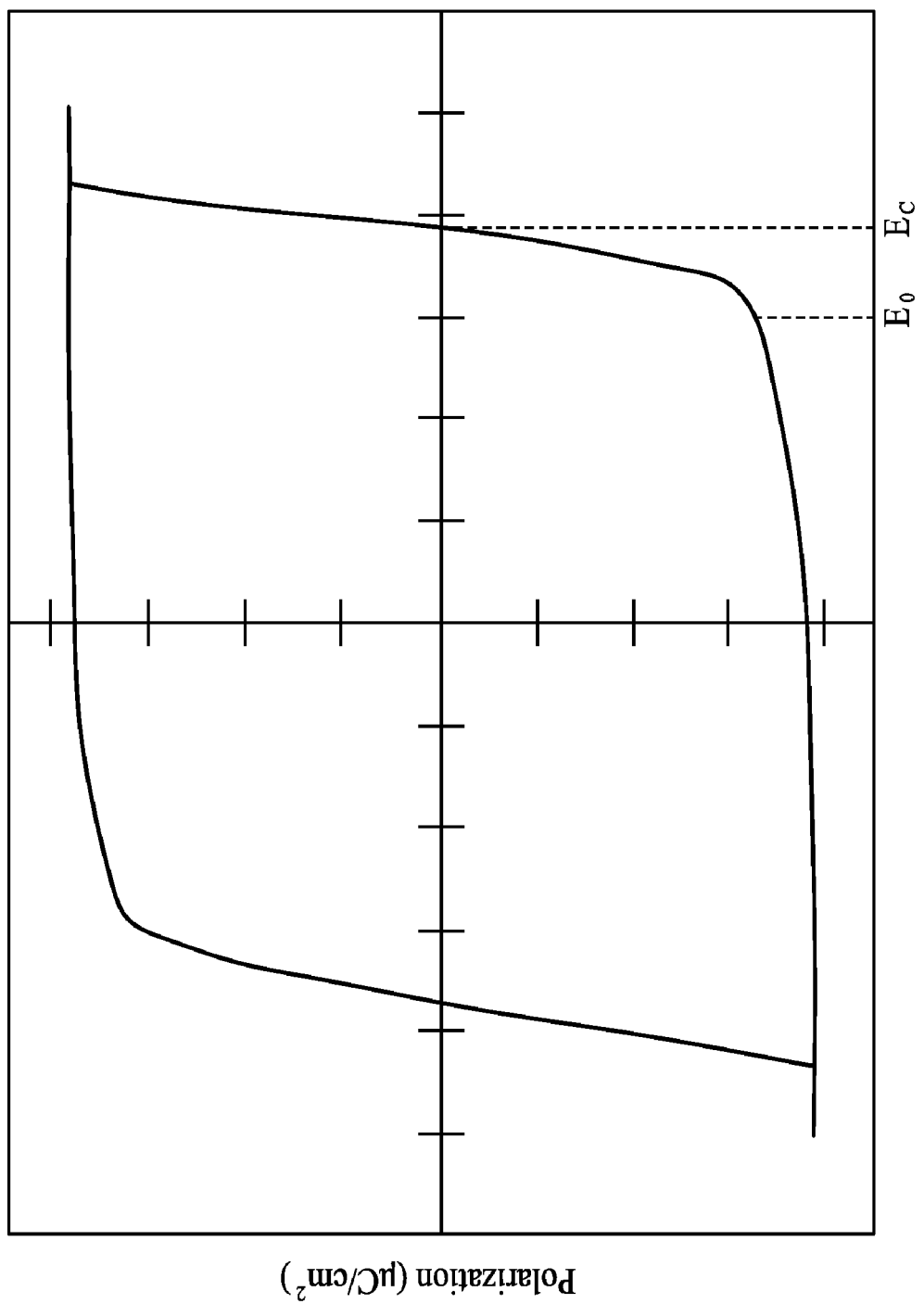

FIG. 9 illustrates another electric field waveform according to another embodiment of the present invention, and FIG. 10 shows the hysteresis behavior of the ferroelectric substrate 12. Compared to the electric field waveform having a plurality of spike-shaped nucleation waves in FIG. 8, the electric field waveform in FIG. 9 has a plurality of trapezoid nucleation waves. The amplitude of the trapezoid electric field is smaller than that of the spike-shaped electric fields. In addition, the amplitude of the trapezoid electric field in the nucleation phase is smaller than that in the spreading phase. Preferably, the amplitude of the trapezoid electric field is smaller than the coercive field ($E_C$) but larger than or equal to the stabilizing field ($E_0$) such that a portion of the ferroelectric substrate 12 has reversed polarization, as shown in FIG. 10. In other words, there are few nucleation sites with reversed polarization direction in the second domains 18 in view of the hysteresis behavior. The amplitude of the trapezoid electric field is preferably between 1.3-1.5 kV/mm for about 50-1000 microseconds.

The above-described embodiments of the present invention are intended to be illustrative only. Numerous alternative embodiments may be devised by those skilled in the art without departing from the scope of the following claims.

What is claimed is:

1. A method for preparing a periodically poled structure, comprising the steps of:
   providing a ferroelectric substrate; and
   performing a poling process by applying a poling current to at least one portion of the ferroelectric substrate according to a current waveform, the current waveform including a major phase and a tailed phase accompanying the major phase, the major phase having at least one peak current (Ip) and terminated when the current drops substantially to Ip/e, and the charge delivered to the portion of the ferroelectric substrate being larger during the major phase than that delivered during the tailed phase, wherein Ip/e represents Ip being divided by the exponent e.

2. The method for preparing a periodically poled structure of claim 1, wherein the ratio of the charge delivered to the portion of the ferroelectric substrate during the major phase to the charge delivered during the tailed phase is between 1:1 and 1:9.

3. The method for preparing a periodically poled structure of claim 1, wherein the ratio of the duration of the major phase to the duration of the tailed phase is between 1:1 and 1:5.

4. The method for preparing a periodically poled structure of claim 1, wherein the tailed phase is terminated dependent on the amplitude of a tail current, and the ratio of the peak current to the tail current is larger than 5.

5. The method for preparing a periodically poled structure of claim 1, wherein the step of applying a poling current to the ferroelectric substrate is performed by applying an electric field according to an electric field waveform, the electric field waveform includes a nucleation phase and a spreading phase accompanying the nucleation phase, the nucleation phase is configured to generate nucleation sites in the portion of the ferroelectric substrate, and the spreading phase is configured to increase the size of the nucleation sites.

6. The method for preparing a periodically poled structure of claim 5, wherein the nucleation phase includes at least one nucleation wave.

7. The method for preparing a periodically poled structure of claim 6, wherein the nucleation wave is spike-shaped, and the electric field applied to the portion of the ferroelectric substrate during the nucleation phase is larger than a coercive field of the ferroelectric substrate.

8. The method for preparing a periodically poled structure of claim 7, wherein the electric field applied to the portion of the ferroelectric substrate is larger during the nucleation phase than that applied during the spreading phase.

9. The method for preparing a periodically poled structure of claim 6, wherein the nucleation wave is trapezoid, and the electric field applied to the portion of the ferroelectric substrate during the nucleation phase is smaller than a coercive field of the ferroelectric substrate.

10. The method for preparing a periodically poled structure of claim 9, wherein the electric field applied to the portion of the ferroelectric substrate is smaller during the nucleation phase than that applied during the spreading phase.

11. The method for preparing a periodically poled structure of claim 5, wherein the electric field applied to the portion of the ferroelectric substrate during the spreading phase decreases in a stepped manner.

12. The method for preparing a periodically poled structure of claim 5, wherein the electric field applied to the portion of the ferroelectric substrate during the spreading phase decreases in a ramp-shaped manner.

13. The method for preparing a periodically poled structure of claim 1, further comprising a step of performing a pre-poling process by applying a reiterating electric field to the portion of the ferroelectric substrate according to a reiterating waveform, wherein the reiterating waveform includes a plurality of waves configured to reiterate inversions of the portion of the ferroelectric substrate.

14. The method for preparing a periodically poled structure of claim 13, wherein the waves are square, and the electric field applied to the portion of the ferroelectric substrate during the pre-poling process is larger than a coercive field of the ferroelectric substrate.

15. The method for preparing a periodically poled structure of claim 1, wherein the poling current is applied to a plurality of portions of the ferroelectric substrate, and the portions are positioned in a periodical manner.

16. A method for preparing a periodically poled structure, comprising the steps of:
providing a ferroelectric substrate; and
performing a poling process by applying a poling electric field to at least one portion of the ferroelectric substrate according to an electric field waveform including a nucleation phase and a spreading phase accompanying the nucleation phase, wherein the nucleation phase is configured to generate nucleation sites in the portion of the ferroelectric substrate and the spreading phase is configured to increase the size of the nucleation sites.

17. The method for preparing a periodically poled structure of claim 16, wherein the nucleation phase includes at least one nucleation wave.

18. The method for preparing a periodically poled structure of claim 17, wherein the nucleation wave is spike-shaped, and the electric field applied to the portion of the ferroelectric substrate during the nucleation phase is larger than a coercive field of the ferroelectric substrate.

19. The method for preparing a periodically poled structure of claim 18, wherein the electric field applied to the portion of the ferroelectric substrate is larger during the nucleation phase than during the spreading phase.

20. The method for preparing a periodically poled structure of claim 17, wherein the nucleation wave is trapezoid, and the electric field applied to the portion of the ferroelectric substrate during the nucleation phase is smaller than a coercive field of the ferroelectric substrate.

21. The method for preparing a periodically poled structure of claim 20, wherein the electric field applied to the portion of the ferroelectric substrate is smaller during the nucleation phase than during the spreading phase.

22. The method for preparing a periodically poled structure of claim 16, wherein the electric field applied to the portion of the ferroelectric substrate during the spreading phase decreases in a stepped manner.

23. The method for preparing a periodically poled structure of claim 16, wherein the electric field applied to the portion of the ferroelectric substrate during the spreading phase decreases in a ramp-shaped manner.

24. The method for preparing a periodically poled structure of claim 16, further comprising a step of performing a pre-poling process by applying a reiterating electric field to the portion of the ferroelectric substrate according to a reiterating waveform, wherein the reiterating waveform includes a plurality of waves configured to reiterate inversions of the portion of the ferroelectric substrate.

25. The method for preparing a periodically poled structure of claim 24, wherein the waves are square, and the electric field applied to the portion of the ferroelectric substrate during the pre-poling process is larger than a coercive field of the ferroelectric substrate.

26. The method for preparing a periodically poled structure of claim 16, wherein the poling electric field is applied to a plurality of portions of the ferroelectric substrate, and the portions are positioned in a periodical manner.

27. A method for preparing a periodically poled structure, comprising the steps of:
providing a ferroelectric substrate;
performing a pre-poling process by applying a reiterating electric field to at least one portion of the ferroelectric substrate according to a reiterating waveform configured to reiterate inversions of the portion of the ferroelectric substrate; and
performing a poling process by applying a poling electric field to the portion of the ferroelectric substrate according to an electric field waveform including a nucleation phase and a spreading phase accompanying the nucleation phase, wherein the nucleation phase is configured to generate nucleation sites in the portion of the ferroelectric substrate and the spreading phase is configured to increase the size of the nucleation sites.

28. The method for preparing a periodically poled structure of claim 27, wherein the nucleation phase includes at least one nucleation wave.

29. The method for preparing a periodically poled structure of claim 28, wherein the nucleation wave is spike-shaped, and the electric field applied to the portion of the ferroelectric substrate during the nucleation phase is larger than a coercive field of the ferroelectric substrate.

30. The method for preparing a periodically poled structure of claim 29, wherein the electric field applied to the portion of the ferroelectric substrate is larger during the nucleation phase than during the spreading phase.

31. The method for preparing a periodically poled structure of claim 28, wherein the nucleation wave is trapezoid, and the electric field applied to the portion of the ferroelectric substrate during the nucleation phase is smaller than a coercive field of the ferroelectric substrate.

32. The method for preparing a periodically poled structure of claim 31, wherein the electric field applied to the portion of the ferroelectric substrate is smaller during the nucleation phase than during the spreading phase.

33. The method for preparing a periodically poled structure of claim 27, wherein the electric field applied to the portion of the ferroelectric substrate during the spreading phase decreases in a stepped manner.

34. The method for preparing a periodically poled structure of claim 27, wherein the electric field applied to the portion of the ferroelectric substrate during the spreading phase decreases in a ramp-shaped manner.

35. The method for preparing a periodically poled structure of claim 27, wherein the reiterating waveform includes a plurality of waves.

36. The method for preparing a periodically poled structure of claim 35, wherein the waves are square, and the electric field applied to the portion of the ferroelectric substrate during the pre-poling process is stronger than a coercive field of the ferroelectric substrate.

37. The method for preparing a periodically poled structure of claim 27, wherein the poling electric field is applied to a plurality of portions of the ferroelectric substrate, and the portions are positioned in a periodical manner.

* * * * *